United States Patent [19]

Park

[11] Patent Number: 4,782,431

[45] Date of Patent: Nov. 1, 1988

[54] LIGHTING APPARATUS FOR WHEELS OF VEHICLES

[76] Inventor: Seung M. Park, 92-12 Yonhee 2-dong, Seodaemoon-ku, Seoul 120, Rep. of Korea

[21] Appl. No.: 925,119

[22] PCT Filed: Jan. 18, 1986

[86] PCT No.: PCT/KR86/00001

§ 371 Date: Nov. 13, 1986

§ 102(e) Date: Nov. 13, 1986

[87] PCT Pub. No.: WO86/04308

PCT Pub. Date: Jul. 31, 1986

[30] Foreign Application Priority Data

Jan. 28, 1985 [KR] Rep. of Korea .................. 497/85

[51] Int. Cl.$^4$ .................. B60Q 1/32; H02K 7/18; F21V 33/00
[52] U.S. Cl. .................. 362/61; 362/78; 362/192
[58] Field of Search .................. 362/61, 78, 72, 157, 362/192, 193

[56] References Cited

U.S. PATENT DOCUMENTS

| | | | |
|---|---|---|---|
| 2,083,514 | 6/1937 | Brown | 362/78 |
| 3,099,401 | 7/1963 | Bell | 362/78 |
| 3,113,727 | 12/1963 | Bradway | 362/78 |
| 3,971,977 | 7/1976 | Hirt et al. | 362/192 X |
| 4,191,988 | 3/1980 | Kumakura | 362/192 X |
| 4,383,244 | 5/1983 | Knauff | 362/78 X |
| 4,613,010 | 9/1986 | Enocson | 362/192 X |

FOREIGN PATENT DOCUMENTS

2744269  4/1978  Fed. Rep. of Germany .

*Primary Examiner*—Larry Jones
*Attorney, Agent, or Firm*—Kenyon & Kenyon

[57] ABSTRACT

Present invention relates to a lighting apparatus mounted on vehicle wheels for the purpose of not only enhancing the esthetic feature of vehicles but also achieving better traffic safety among vehicles in night operation through illumination of wheel lights. The apparatus comprises a light unit fixed on a wheel member and a miniature magnetogenerator characterized by its rotor being coaxial with the wheel to produce power by rotation following the rotation of wheels.

2 Claims, 4 Drawing Sheets

LIGHTING APPARATUS FOR WHEELS OF VEHICLES

TECHNICAL FIELD

Present invention relates to a self-illuminating apparatus mounted on vehicle wheels.

BACKGROUND OF THE INVENTION

Vehicles in night operation are generally distinguished in outlines by headlights and stop lights mounted on the body of vehicles. Therefore, for safety of a vehicle in night operation in relation to other vehicles or to pedestrians, the vehicle is required to make clearly visible the profiles and positions of its wheels as well as the profile of its body for the other vehicle drivers or pedestrians to distinguish it and avoid possible accident.

Present invention is created to contribute to the safety of vehicles in night operation by providing an illuminating unit on vehicle wheels and thus helping vehicle drivers to overcome the blind spot which occurs while passing another vehicle.

However, in implementing lighting of wheels, difficulty lies in supplying power to light lamps on the wheels from a known source in the vehicle, and the task of connecting the power source to the wheel lamps is almost impossible to carry out because of rotation of the wheels in operation.

In order to overcome such a difficult task, the present invention provides on a rotating member of the wheel 111, a miniature magnetogenerator 1', as shown in FIG. 5, of which the rotor is fixedly arranged to be coaxial with the axis of the wheel and have at its one end a static member 3' having a heavy weight 2' fixedly in suspension from an extended end of the member 3' such that the body of the miniature magnetogenerator rotates, integrally following revolution of the wheel of the vehicle in operation, relative to the rotor being kept stationary by the static member 3' having a weight 2' and induce current in inductance coils in the generator 1' to be connected by means of a lead wire to lamps provided on the rotating member of the wheel.

SUMMARY OF THE INVENTION

Present invention comprises a miniature magnetogenerator 1 or 1', being mounted on a rotating member 111 of a wheel 222, and being seal-covered by a cover 9, of which rotor is arranged to be coaxial with the axis of the wheel 222, one end of said rotor being fixedly fitted with a static member 3 or 3' having a heavy weight 2 or 2' in suspension at its extended end, and an arrangement of light lamps 12 arranged on a base plate 13, which is then fixed to the cover 11 of the wheel 222 to fittingly match light windows 14 arranged on the cover 11 and is connected to inductance coils 6 of the generator 1 or 1' by means of a lead wire.

Figure 1:
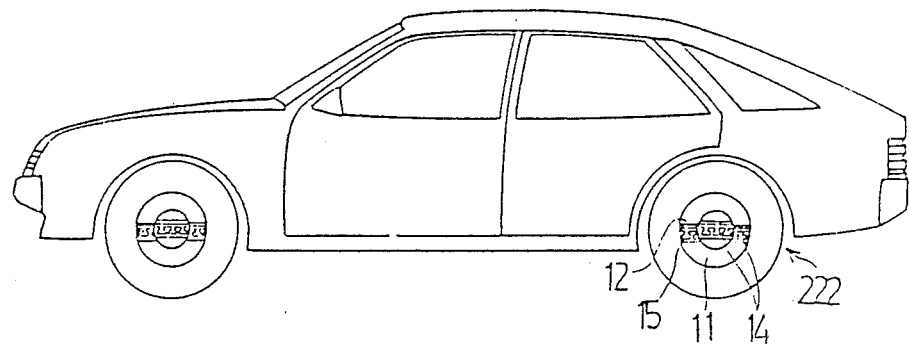
FIG. 1 is a schematic illustration of a vehicle carrying an embodiment of the present invention.
Figure 2:
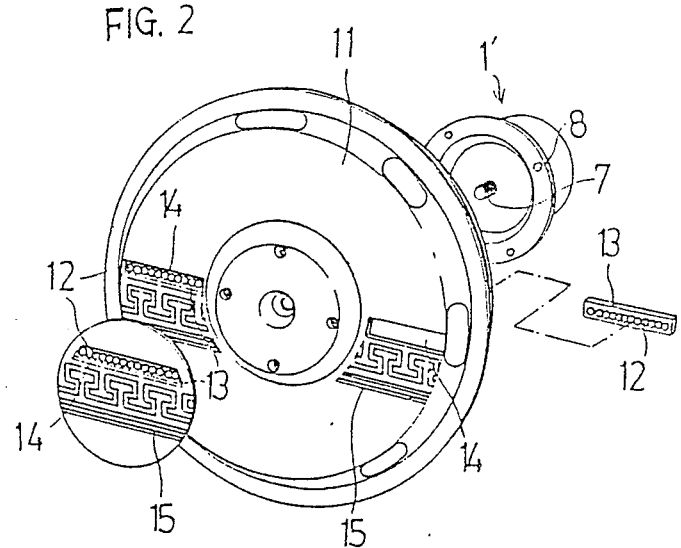
FIG. 2 is an exploded view showing an embodiment of the invention.
Figure 3:
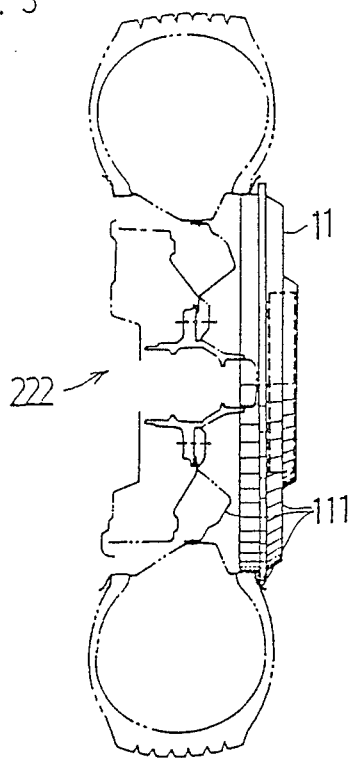
FIG. 3 is a side view showing the apparatus of the invention in a mounted position.

Numerals in the drawings indicate as follows: 1 and 1' indicate miniature magnetogenerators, 2 and 2' weights, 3 and 3' static members, 4 a static shaft, 5 a rotary plate, 5' an oilless bearing, 6 lead wire, 7 a clamp screw, 8 bolt holes, 9 a cover, 10 a ferrite magnet, 11 a wheel cover, 12 lamps, 13 a base plate for lamps, 14 lamp windows, 15 ornaments, 111 rotating members, and 222 a wheel.

DETAILED DESCRIPTION OF THE INVENTION

Present invention employs a known magnetogenerator in such a manner that the generator is fixed by means of a static shaft 4 to a rotating member 111 of a wheel 222 for the rotation axis of the generator to be coaxial with that of the wheel 222, an end of said shaft 4 being fixedly fitted with a static member 3 or 3' being kept static by means of a weight 2 or 2' being suspended at an extnded end of the static member relative to the inductance coils, thus inducing electric current in the generator with revolution of the wheels. The generator being fixed to the wheel 222 is sealed by a cover 9 to be waterproof and to prevent dust from entering.

Electric current generated at the generator is supplied by means of a lead wire to lamps 12 arranged on a base plate 13 being fixed to a wheel cover 11 to cast light through windows provided on the cover 11. Lamps 12 may preferably be semiconuctor light emitting diodes (L.E.D.) or vibration absorbing mini bulbs and are fixedly prearranged on a base plate 13 which is then fixed to the inner side of a cover 11 of the wheel 222 by means of adhesion, welding or screwing to match with the arrangement of light windows 14 also prearranged on the cover 11. Although the shape or arrangement of the windows 14 is not restricted, care should be taken for the arrangement of the windows 14 not to cause eccentricity of gravity on the rotating member 111 and thus result in vibration of the wheel in high speed operation and also not to impair the esthetic appearance of the wheel in day time operation.

The lights of the invention are provided on the wheels for the purpose of functioning both as marker lights for indicating the profile and position of the wheels in motion and as decorative lights for enhancing the esthetic appearance of the wheels that they may be arranged so as to illuminate in circular band forms to indicate the profile of the wheel in coaxial rotation or to illuminate in different color light bands in accordance with different color arrangements of lights to make the vehicle colorful in night operation.

The advantage of fixing the lights of the invention to the wheel cover 11 is that it may be easily arranged to keep in harmony with designs of other ornaments on the cover 11 and be replaceable, as desired, with another unit of different shape or color, and also that it is easy to incorporate the apparatus into an assembly unit with the wheel cover for a unit product and sealingly cover the generator 1 or 1' to protect it from water and dust.

Figure 4:
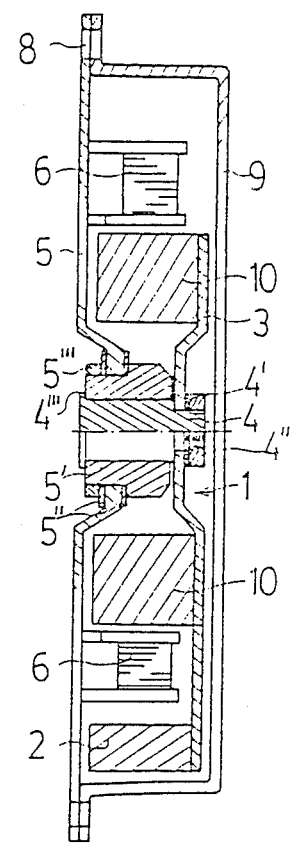
FIG. 4 is a sectional view showing the assembled construction of a miniature magnetogenerator of the invention.
Figure 5:
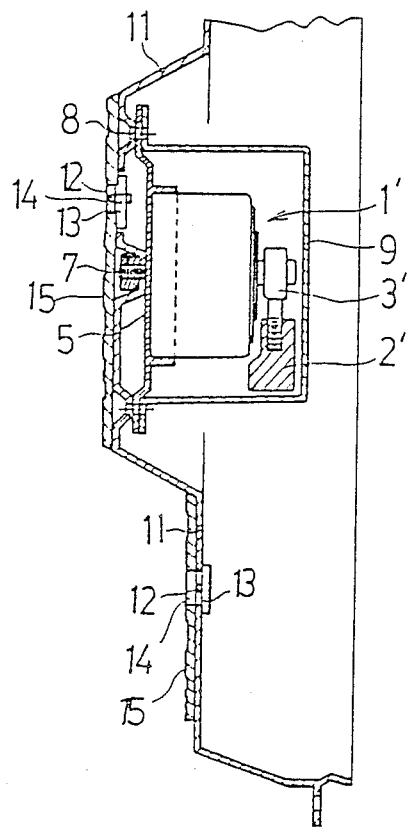
FIG. 5 is a sectional view showing a portion of an assembled construction of the invention.
Figure 6:
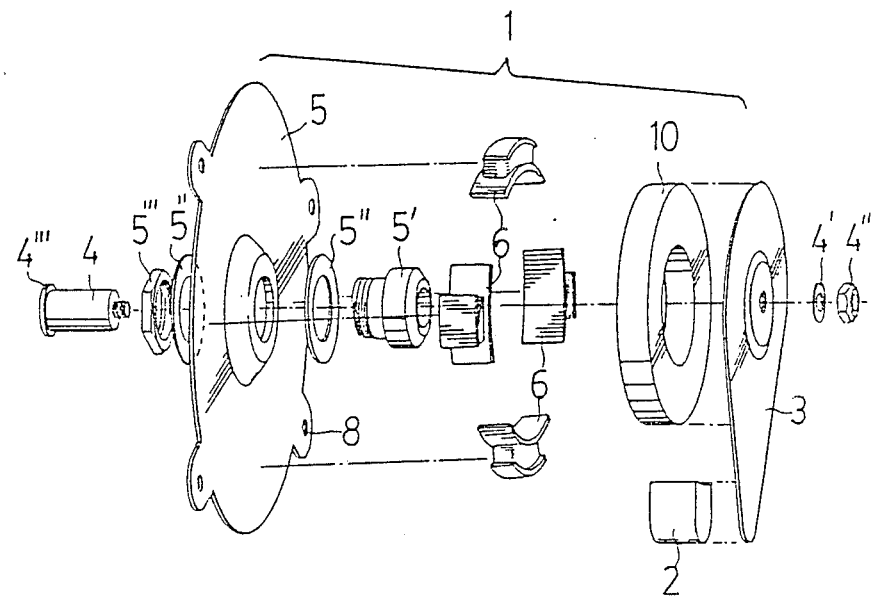
FIG. 6 is a perspective view of exploded parts of the generator of FIG. 4.

In view of the above feature, the generator may be constructed in a thin form, as shown in FIGS. 4 and 6, which is different in shape from an ordinary miniature magnetogenerator. As shown in FIGS. 4 and 6, the generator has a stationary shaft 4 having a flange 4''' at one end and a tapped hole at the other end and going through an oilless bearing 5' to be securely clamp-joined by means of a washer 4' and a nut 4'' to a stationary plate 3 on which on the inner side a multipolar ferrite magnet 10 in a ring form about the shaft 4 is fixed with, an extended end of the plate 3 having a heavy weight 2. A rotary plate 5, which is fittingly clamp-joined on to the oilless bearing 5' by means of washer 5'' and a nut 5''' to be coaxial between them, is provided with an adequate number of inductance coil 6 to induce single phase or multi-phase alternative current in correspondance to the multipolar ferrite magnet 10 of ring to constitute a miniature magnetogenerator 1 for use on a vehicle wheel.

Along the edge of the rotary plate 5 there are provided bolt holes 8 to clap-join the plate by means of a bolts and nuts to the wheel cover 11. The oilless bearing 5' being fitted on to the stationary shaft 4 is made of oilless metal to minimize frictional resistance between the surfaces of the shaft and bearing. The bearing may be of ball bearing instead of the oilless bearing.

In the generator 1 of the above construction, the rotary plate 5 is fixed to the inner side of the wheel cover 11 to be coaxial with the rotation axis of the wheel that when the inductance coils 6 fixed to the rotary plate 5 rotated following the rotation of the wheel and its cover 11 relative to the stationary magnet 10 fixed to the static plate 3 within the magnetic field of the magnet 10, electric current is induced in the coils 6 to be supplied through lead wire to light lamps 12 arranged on the rotating member 111.

An advantage of the generator of the above construction is that, compared with an ordinary miniature generator, it may be constructed in a thin and light unit to make it very easy to mount on to the rotating member of the wheel. Besides, the generator 1 is completely covered and sealed by a cover 9 to be waterproof that it is safe even in submerged operation of the wheel or from dust penetration. The rotary plate 5 and the cover 9 also function as radiators to give off heat generated in the generator.

Conclusively, the present invention not only enhances esthetic appearance of vehicles by lights provided on vehicle wheels but also has an effect for achieving an improved traffic safety, in relation of a vehicle to a vehicle or to pedestrians, by clearly presenting the positions and profiles of wheel, particularly in night operation.

I claim:

1. Lighting apparatus for a wheel cover for a wheel of a motor vehicle wherein said wheel cover is provided with light windows and said lighting apparatus includes an electrical generator having a rotor and a stator, said lighting apparatus comprising:
    a first plate fixedly mounted to said wheel cover for rotation therewith;
    a shaft mounted by bearing means to said first plate;
    a second plate mounted mounted on said shaft with said stator being fixedly mounted on said second plate;
    said rotor being fixedly mounted on said first plate for rotation therewith and about said shaft and said stator;
    means cooperating with said second plate for preventing rotation of said shaft;
    light emitting diodes (LED) or mini bulbs mounted to correspond with respective light windows;
    means for electrically connecting said light emitting diodes or said mini bulbs to said generator.

2. A lighting apparatus according to claim 1 wherein said wheel cover has a design or ornaments thereon and said light windows are in harmony with said design of ornaments.

* * * * *